Patented May 14, 1935

2,001,608

UNITED STATES PATENT OFFICE 2,001,608

PORTLAND CEMENT PRODUCT

Chester G. Gilbert, Washington, D. C., assignor to Research Corporation, New York, N. Y., a corporation of New York No Drawing. Application November 1, 1932, Serial No. 640,705

3 Claims. (Cl. 106—25)

The present invention relates to compositions of matter comprising filler materials and vehicles, and is concerned with the improvement of that class of compositions comprising essentially inert fillers which require, as a function of their use, relative motion between portions of the compositions. More specifically it relates to compositions of which such physical properties as viscosity, plasticity and flexibility are of importance during the formation and/or use of the compositions, the physical properties being dependent upon or modified by the characteristics of the filler materials of which the compositions are, in part, composed. And, in particular, the invention consists in the improvement of compositions of the aforesaid character by the use therein of spherulized—as opposed to angularly shaped—filler particles.

The expression "filler" is, in the present connection, intended to include solid substances which, when incorporated into a composition, tend to modify one or more of the physical characteristics of the composition without entering, to any appreciable degree, into a chemical reaction with the other ingredient or ingredients of the composition.

In considering the adaptability of any specific filler material for any specific use involving relative movement between particles of the filler material themselves or within a body wherein flexure is a function of the use thereof, the sizing, pack and friction contour of the particles are important factors.

The subject of the size of the filler particles is important, since in many industries relatively small variations in size are recognized to have a significant bearing on the quality of the product, and the rubber, paint, paper, and other industries have established rigid specifications covering size of filler particles. Nevertheless size specifications in the selection of non-spherular or angular filler particles are more or less meaningless. Thus, in the case of non-spherular filler particles, a specification such as "98% through 300 mesh" can have significance only as indicating that 98% of the particles shall have two dimensions less than 300 mesh; it is an exact specification of an inexact condition, because the particle's third dimension may be such as to put the particle in the plus or minus 300 mesh classification depending upon which surface or area of the particle is presented to the screen. Depending upon the mode of the screening of such material varying screen analyses are obtained, and this fact has given rise to attempts at standardization of the time of shaking, the degree of agitation of the sample, etc.

In the case of spherular fillers, the material is presented in a form which permits exact screen analysis. There is little cause for modes of screening and the human equation preventing very close checks between different analyses and in preparing batches of definite sizes for commercial use is made negligible. Many formulæ call for particles of substantially equal diameter or screen size. Some compositions are made with a filler comprising particles of different size. For either requirement, spherulized filler particles can be accurately sized and added in the proportions desired. The pack and flow characteristics are much more definite when spherulized and accurately sized particles are used.

Again, the subject of the pack of filler materials is of importance. Spherular pack is mathematically determinable: for a given size of spherical particles, or for a given variation in sizes, the size or sizes of the voids in a pack of the particles is a function of the particle size and therefore exactly determinable. Angular pack, on the contrary, obviously does not give a uniformly sized pore space or one that is determinable mathematically.

A further criterion of the adaptability of a filler material is the matter of the friction contour of the particles thereof. The minimum of frictional resistance is afforded by a spherical surface with the rolling, rather than slipping and abrading, action which spherical surfaces provide. Such spherical particles afford not only the maximum freedom of movement but also the maximum uniformity of movement throughout the body.

Spherical materials give uniform contact areas which are in the form of point contacts rather than surface contacts. With angular materials contact between the particles ranges all the way from point contacts to various dimensional face contacts.

In the case of Portland cement it is now recognized that the Portland cement particle furnishes both cement and filler. That is to say, to a certain extent the particle is soluble, giving a cement, and to a certain extent remains solid or semi-solid, giving a filler effect. While the extent to which solution occurs upon addition of water to Portland cement is open to question, it is now generally recognized that from 10 to 20% of the cement actually dissolves. That being the case, it should be expected that the above-discussed principles of "pack" become important.

Spherulizing of the Portland cement particles gives a product having improved smoothness and "slip" in use, and improved uniform density of final product (concrete).

Similarly, experiments show that the use of spherulized filler in rubber compositions imparts greater flexibility and longer life to the product.

In preventing the friction of one body against another (e. g., between an inner tube and its casing) the use of a powder consisting of spherulized particles gives maximum freedom of movement. Similarly, in connections where two surfaces are to be separated or prevented from sticking together (e. g., where use of a dusting agent is called for), spherulized particles with their point contact provide an improved dusting agent as opposed to angular particles with face contact.

The above are merely illustrations of the improved results obtained by substituting spherulized particles for angular particles in relations where the individual particles are called on for relative movement either between bodies or within a flexible body: that is to say, between bodies subjected to relative movement or within bodies where flexure or movement is a function of the use. The above instances illustrate plasticity and pack in the case of Portland cement; freedom of movement in the case of dusting powders and cleaning powders; and sizing in all cases.

The spherulization of filler materials may be effected by the process described and claimed in the application for Letters Patent Serial No. 641,129, filed November 1, 1932, in the name of Chester G. Gilbert, which process, in essence, consists in positively dispersing finely pulverized filler materials in a suitable fluid dispersing agent, such, for instance, as air, and subjecting the dispersion to heating at the fusing temperature of the filler material. Or, the material may be spherulized in any other convenient manner.

Many products are not plastic or flexible when in finished form but the materials of which they are made must have such properties at one stage of their formation because the materials are, after being mixed, fabricated in molds or otherwise worked into definite shapes after which they are permitted to or do set or harden. Many compositions classified under the general subject of plastics have these characteristics and especially pertinent are the compositions found in the field of ceramics.

It is common practice to add lime or a clay slip to compositions which include cement in order to give the composition smoothness and true plasticity during the time it is being spread or worked into some definite shape even though the clay may detract from the strength of the final product. If spherulized filler in finely divided form is added to such a composition it gives to the freshly mixed composition the requisite smoothness and plasticity and yet the product when set is of high tensile strength and uniform density. In fact, it has been found that there are great advantages in spherulizing the cement itself.

When ordinary Portland cement is spherulized by the present process, the particles are given a less diameter (spherules as against angular particles), and uniform pack; and also are made denser. When this product is made up with water with or without the addition of spherulized sand, the mixture has a plasticity comparable with that of hydrated lime, whereby it is adapted for use as a wall plaster or a stucco. Also, owing to the close and uniform pack of the particles, the density and strength of the resulting plaster or kindred product are increased.

The art is now adding up to 15% clay or talc to plaster of Paris in the manufacturing of so-called hard wall plaster, this addition being in the interest of plasticity or "slip". It has been found that the substitution of about the same quantity of finely sized spherules (glass, volcanic ash, silica, or the like), imparts this desired slip to the same extent without materially depreciating strength. The clay or talc materially decreases the strength of the hard wall plaster.

If the particles are irregular in shape and size they do not present, individually, equal areas of surface to the mixture to which they are added; and, collectively, they do not present a uniform surface condition because the interstices between such particles are very irregular. Small particles with flat sides may stay together and the liquid may not get between and "wet" the adhering surfaces. In some places the thickness of the joining material will be much greater than in other places. Upon consideration, it is apparent that a filler made up of irregular particles, even when small, cannot offer a uniform surface condition for holding and strengthening a plastic or semi-liquid composition.

A filler made up of spherical particles does present a uniform surface to such a composition. Spherical particles are easily separated and distributed during mixing and, where they do touch each other it is only a point contact. There is a limit, therefore, to the thinness of the film between spherical particles and no chance to prevent exposure of the major part of the surface of a particle as there is when flat particles lie one against another. And, when the spherules are all of equal size, the surfaces exposed by all particles are equal and the interstices between particles are very uniform.

Spherulized glass, volcanic ash, or silica, may be substituted for barytes or other material used purely as a filler in rubber compositions. It has been found that these spherulized fillers effect a marked increase in the flexibility of the resulting rubber product for a given firmness, or for a given amount of filler.

I claim:

1. Method of improving the plasticity and other properties of a Portland cement product, which consists in dispersing the Portland cement product, in finely subdivided form, in a fluid dispersing agent, subjecting the resulting dispersion to heating at the fusing temperature of the said product, and separating the resulting spherulized Portland cement product from suspending medium.

2. An improved Portland cement product characterized in that the individual particles thereof are spherical.

3. A Portland cement product characterized by the fact that the individual particles of the product are spherical, said product being additionally characterized by improved plasticity, flexibility, smoothness and uniform density, said product being produced by dispersing particles of preformed Portland cement in a fluid dispersing agent, subjecting the resulting dispersion to heating at the fusing temperature of the said product, and separating the resulting spherulized Portland cement product from suspending medium.

CHESTER G. GILBERT.